(12) United States Patent
Hayashi et al.

(10) Patent No.: US 12,112,279 B2
(45) Date of Patent: Oct. 8, 2024

(54) BEHAVIOR PREDICTION DEVICE

(71) Applicant: TOYOTA JIDOSHA KABUSHIKI KAISHA, Toyota (JP)

(72) Inventors: Yusuke Hayashi, Susono (JP); Taichi Kawanai, Susono (JP); Daichi Hotta, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 385 days.

(21) Appl. No.: 17/485,893

(22) Filed: Sep. 27, 2021

(65) Prior Publication Data

US 2022/0172089 A1 Jun. 2, 2022

(30) Foreign Application Priority Data

Nov. 30, 2020 (JP) ................................ 2020-198831

(51) Int. Cl.
*G06N 7/01* (2023.01)
*G05B 13/02* (2006.01)

(52) U.S. Cl.
CPC ........... *G06N 7/01* (2023.01); *G05B 13/0265* (2013.01)

(58) Field of Classification Search
CPC ..... G06N 7/01; G05B 13/0265; B60W 30/08; B60W 40/04; B60W 30/0956;
(Continued)

(56) References Cited

U.S. PATENT DOCUMENTS

2012/0271518 A1* 10/2012 Van Den Broek ............... B60W 30/0956
701/409
2014/0136045 A1* 5/2014 Zhu ........................ G06T 7/231
701/23
(Continued)

FOREIGN PATENT DOCUMENTS

CN 102576494 A 7/2012
JP 2019-182093 A 10/2019
(Continued)

OTHER PUBLICATIONS

Ba et al., Crash prediction with behavioral and physiological features for advanced vehicle collision avoidance system, 2017, Transportation Research Part C. p. 22-33 (Year: 2017).*

*Primary Examiner* — Kidest Bahta
(74) *Attorney, Agent, or Firm* — Dinsmore & Shohl LLP

(57) ABSTRACT

A distribution calculation process, a similarity level calculation process, a similarity level evaluation process, and a collision determination process are executed. In the distribution calculation process, a probability density distribution related to a future position of a moving object is calculated for each behavior pattern using position data and speed data of the moving object, error data thereof, and a plurality of behavior models set for each behavior pattern corresponding to a type of the moving object. In the similarity level calculation process, a similarity level between the probability density distribution and a reference probability density distribution is calculated for each behavior pattern. In the similarity level evaluation process, the similarity level is evaluated. The similarity level includes an out-of-range level falling below a similarity allowable range. In the similarity level evaluation process, the behavior pattern having the out-of-range level is excluded from a target of the collision determination process.

4 Claims, 10 Drawing Sheets

(58) Field of Classification Search
CPC .... B60W 30/095; B60W 40/00; B60W 40/02; B60W 50/00; B60W 2050/0002
See application file for complete search history.

(56) References Cited

U.S. PATENT DOCUMENTS

2019/0016339 A1* 1/2019 Ishioka ................. G08G 1/166
2019/0311272 A1* 10/2019 Kamata .................. G06N 5/02

FOREIGN PATENT DOCUMENTS

WO      2011043658 A1      4/2011
WO   WO-2015155867 A1 *  10/2015  ............... G08G 1/16

* cited by examiner

FIG. 3
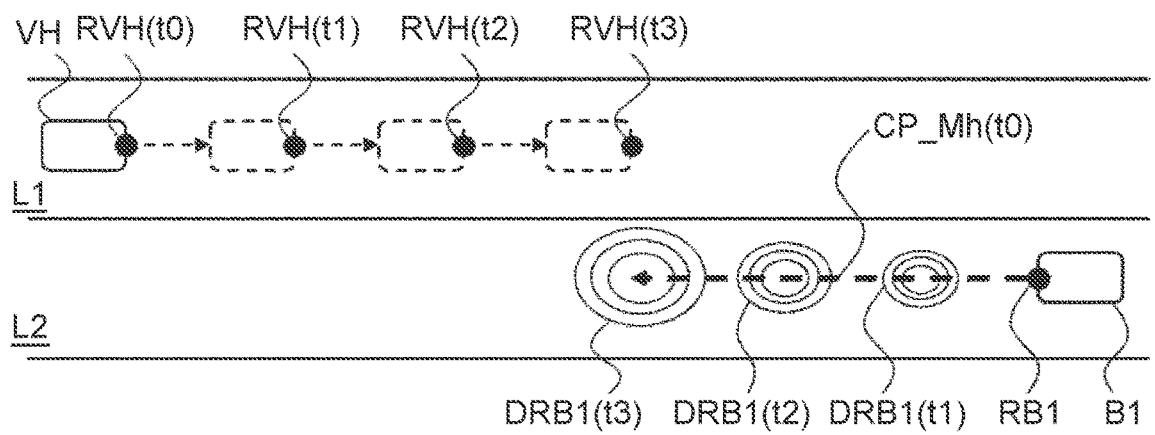
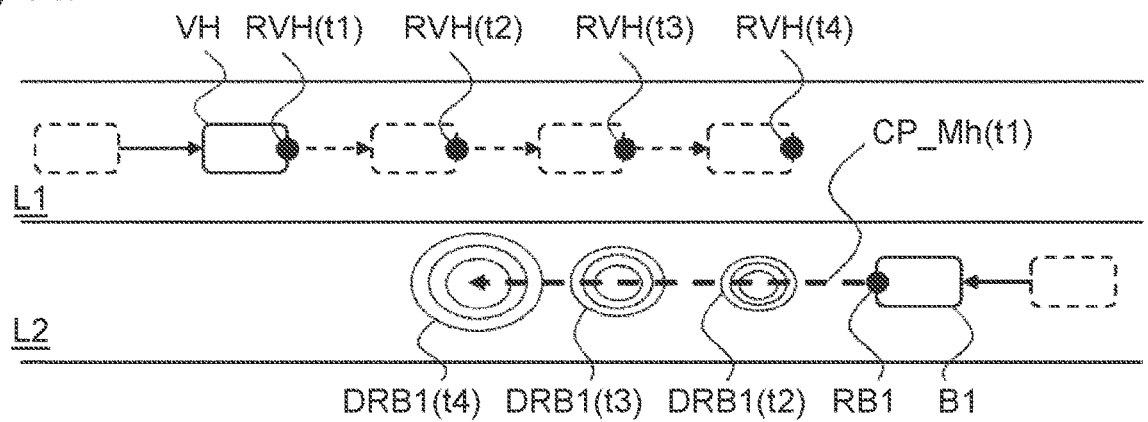

FIG. 6
(i) t=t0
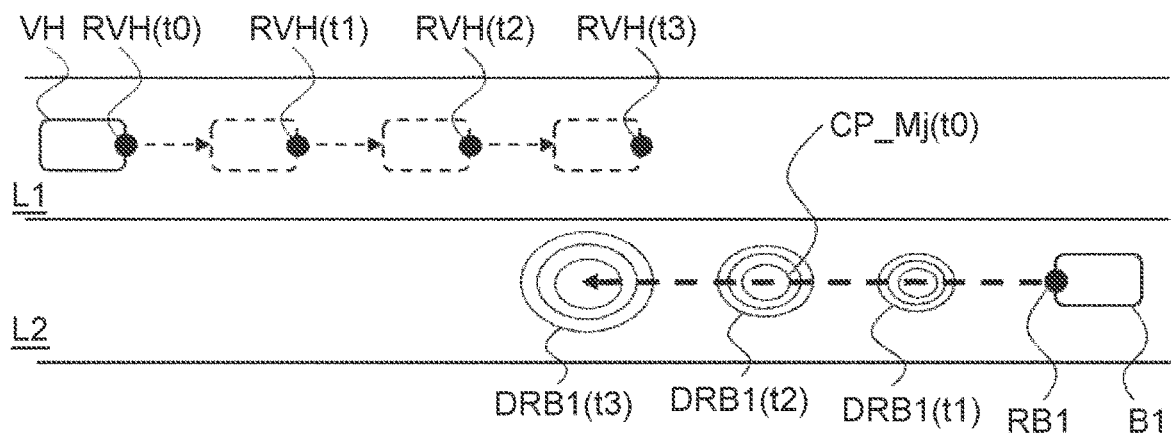
(ii) t=t1
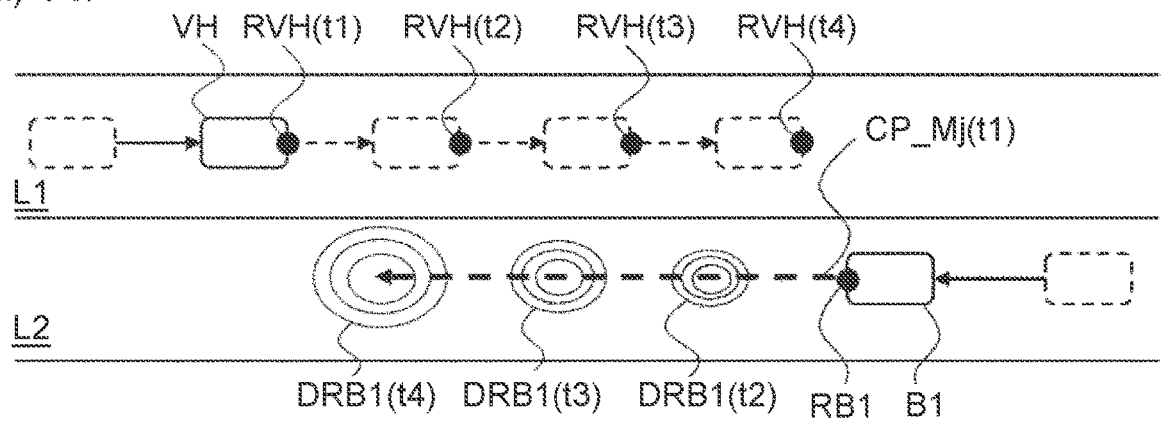

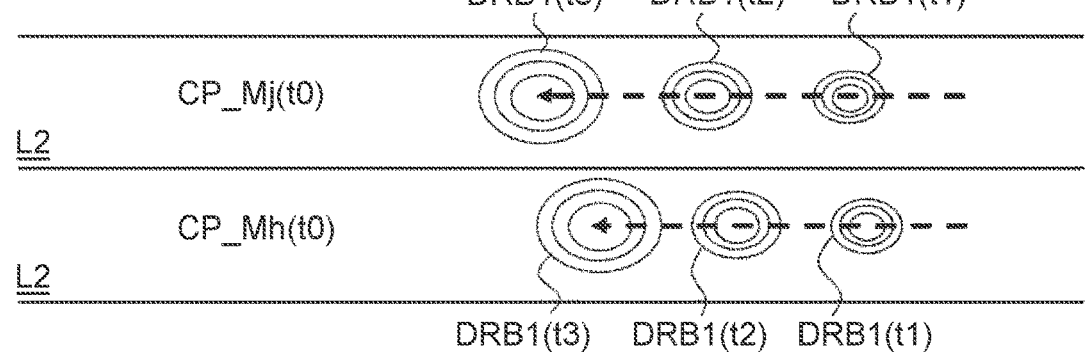
FIG. 7
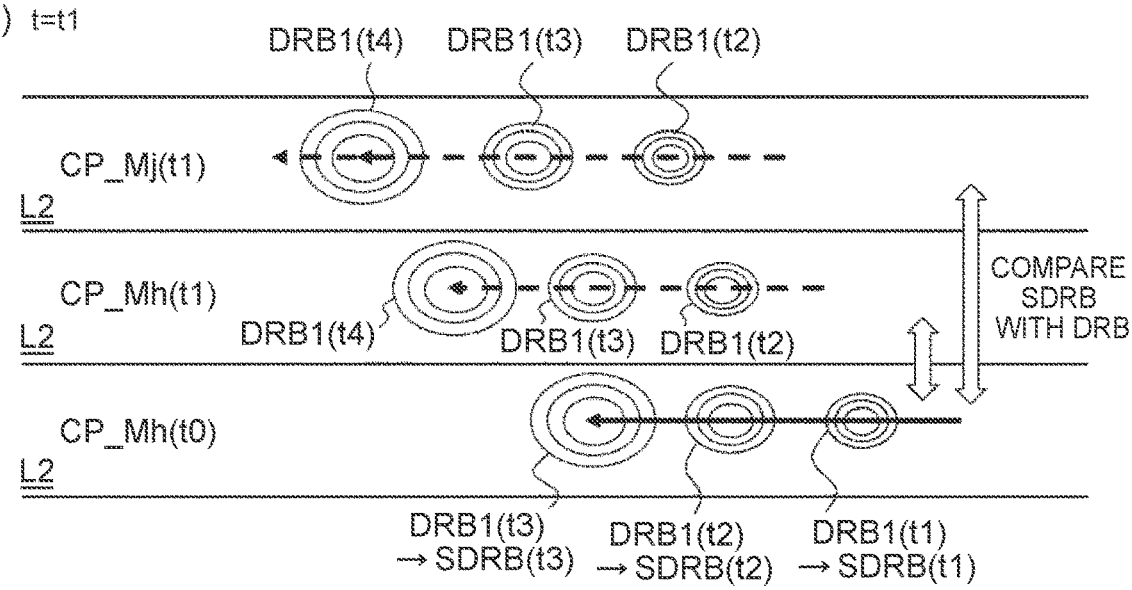
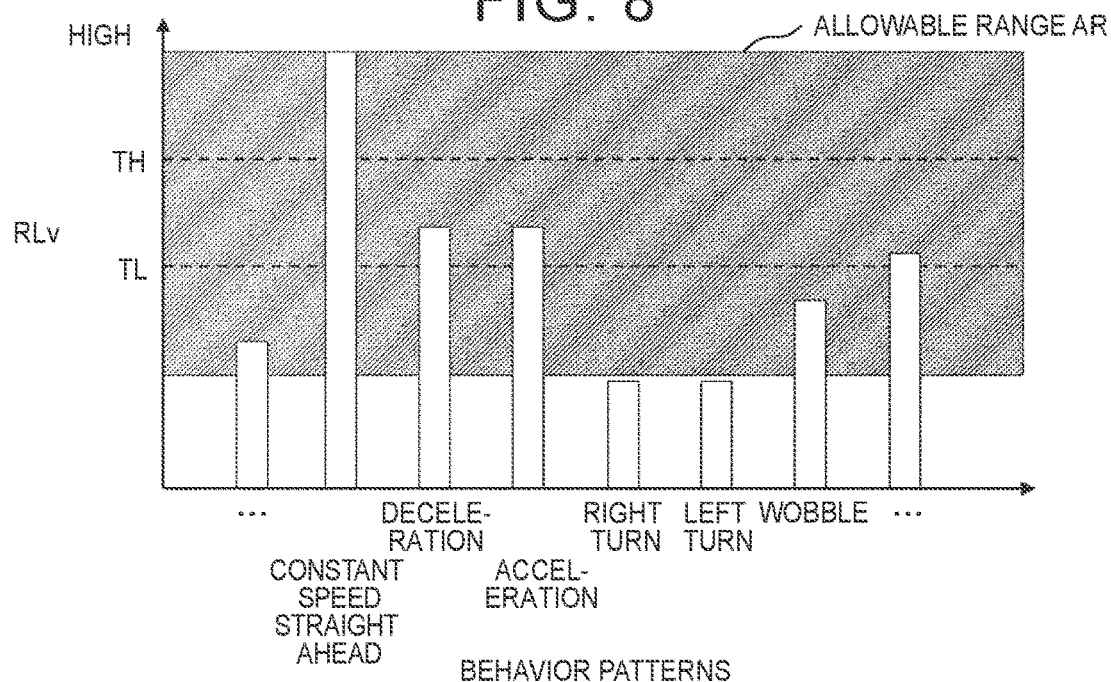
FIG. 8

BEHAVIOR PREDICTION DEVICE

CROSS-REFERENCE TO RELATED APPLICATION

This application claims priority to Japanese Patent Application No. 2020-198831 filed on Nov. 30, 2020, incorporated herein by reference in its entirety.

BACKGROUND

1. Technical Field

The present disclosure relates to a device for predicting future behavior of a moving object around a vehicle, the moving object being detected by the vehicle.

2. Description of Related Art

Japanese Unexamined Patent Application Publication No. 2019-182093 (JP 2019-182093 A) discloses a device for predicting future behavior of a moving object around a vehicle. The conventional device predicts the future behavior of the moving object detected by the vehicle using a behavior prediction model. The behavior prediction model is preset in association with the type of moving objects, such as a four-wheeled vehicle, a two-wheeled vehicle, a pedestrian, or a bicycle. The prediction result by the behavior prediction model is compared with the actual detection result of the moving object detected by the vehicle. When the prediction result and the detection result deviate from each other, the conventional device estimates the reason. The reason for the deviation is also set in advance. The conventional device also modifies the behavior prediction model currently in use or switches the behavior prediction model to a behavior prediction model corresponding to a different type, depending on the reason for the estimated deviation.

SUMMARY

The conventional device focuses on estimation of the reason for the deviation. Therefore, the number of behavior prediction models used in future prediction matches the number of preset types of moving objects. Accordingly, when the prediction result and the detection result deviate from each other, the behavior prediction model currently in use is modified or switched to a behavior prediction model corresponding to another type.

A case where a focus is placed on avoidance of collisions with moving objects is considered. In this case, it is desirable that a plurality of behavior prediction models be set for each type of moving object. This is because when the number of behavior prediction models and the number of types of moving objects are the same, even when the reason for the deviation between the prediction result and the detection result is a "situation where a collision is imminent", the behavior prediction model is modified or switched. This causes a delay in prediction of the future behavior of the moving object in the "situation where a collision is imminent".

When a plurality of behavior prediction models is set for each type of moving object, it is possible to identify, at an early stage, that the situation is the "situation where a collision is imminent" based on the prediction result of any of the behavior prediction models. However, in this case, there is a possibility that the prediction result by any of the behavior prediction models indicates the "situation where a collision is imminent" even though the actual situation is not the "situation where a collision is not imminent". Then, based on this erroneous prediction result, the collision avoidance operation of the vehicle may be started. Alternatively, a collision warning may be issued to a driver of the vehicle based on this erroneous prediction result. Accordingly, improvement from a practical point of view is required.

One object of the present disclosure is to provide a highly practical technique in the case where the future behavior of a moving object around a vehicle is predicted using a plurality of behavior prediction models set for each type of the moving object.

A first aspect of the present disclosure is a behavior prediction device that predicts a future behavior of a moving object around a vehicle, the moving object being detected by the vehicle.

The behavior prediction device includes a database, a memory, and a processor.

The database stores a plurality of behavior models set for each behavior pattern corresponding to a type of the moving object.

The memory stores position data and speed data of the moving object and error data indicating an error of the position data and the speed data.

The processor is configured to execute a distribution calculation process, a similarity level calculation process, a similarity level evaluation process, and a collision determination process.

In the distribution calculation process, a probability density distribution related to a future position of the moving object is calculated for each of the behavior patterns using the position data, the speed data, the error data, and the behavior models.

In the similarity level calculation process, a similarity level between the probability density distribution and a reference probability density distribution is calculated for each of the behavior patterns. The reference probability density distribution indicates the probability density distribution calculated using the behavior model corresponding to a current behavior of the moving object at a processing timing prior to a current processing timing of the distribution calculation process.

In the similarity level evaluation process, the similarity level is evaluated.

In the collision determination process, a collision between the vehicle and the moving object is determined using the probability density distribution.

The similarity level includes an out-of-range level that falls below a similarity allowable range.

In the similarity level evaluation process, the processor excludes the behavior pattern having the out-of-range level from a target of the collision determination process.

A second aspect of the present disclosure has the following feature in addition to the first aspect.

The similarity level includes a low similarity level that is present within the similarity allowable range and falls below a low similarity threshold set within the similarity allowable range.

The processor is further configured to execute an error data changing process.

In the error data changing process, the error data is changed based on the similarity level. In the error data changing process, the processor increases the error data to be used at a next processing timing of the distribution calculation process using a low similarity model as compared with the error data used at the current processing timing of the distribution calculation process. The low similarity model indicates the behavior model corresponding to the behavior pattern having the low similarity level.

A third aspect of the present disclosure further has the following feature in addition to the first aspect or the second aspect.

The similarity level includes a high similarity level that is present within the similarity allowable range and exceeds a high similarity threshold set within the similarity allowable range.

The processor is further configured to execute an error data changing process.

In the error data changing process, the error data is changed based on the similarity level. In the error data changing process, the processor decreases the error data to be used at a next processing timing of the distribution calculation process using a high similarity model as compared with the error data used at the current processing timing of the distribution calculation process. The high similarity model indicates the behavior model corresponding to the behavior pattern having the high similarity level.

A fourth aspect of the present disclosure has the following feature in addition to any one of the first to third aspects.

The similarity level includes a high similarity level that is present within the similarity allowable range and exceeds a high similarity threshold set within the similarity allowable range.

The processor is further configured to execute a distribution recalculation process.

In the distribution recalculation process, the probability density distribution is recalculated using a high similarity model indicating the behavior model corresponding to the behavior pattern having the high similarity level.

In the distribution recalculation process, the processor executes a superposition of the probability density distribution calculated using the high similarity level at the current processing timing on the probability density distribution calculated using the high similarity level at a processing timing prior to the current processing timing.

In the collision determination process, the processor determines the behavior pattern having the high similarity level based on the probability density distribution after the superposition by the distribution recalculation process.

According to the first aspect, the distribution calculation process, the similarity level calculation process, and the similarity level evaluation process are executed. In particular, according to the similarity level evaluation process, it is possible to exclude the behavior pattern having the out-of-range level from the target of the collision determination process. Therefore, it is possible to avoid starting the collision avoidance operation that is originally unnecessary. Accordingly, when the behavior pattern is predicted using various behavior models, it is possible to suppress instability of a traveling state of the vehicle. In addition, it is possible to suppress execution of a collision warning that is originally unnecessary. Accordingly, it is possible to suppress execution of the collision warning from causing a driver to feel a sense of discomfort. From the above, according to the first aspect, it is possible to provide a highly practical technique.

Further, according to the second aspect, the error data changing process is executed in addition to the similarity level evaluation process. According to the error data changing process, the error data to be used at the next processing timing of the distribution calculation process using the low similarity model is changed to error data larger than the error data used at the current processing timing of the distribution calculation process. When the error data becomes larger, the standard deviation of the probability density distribution calculated using the low similarity model at the next processing timing becomes larger. Therefore, the similarity level can fall below the allowable range by lowering the similarity level calculated from the probability density distribution above. Consequently, the behavior pattern evaluated to have the low similarity level at the current calculation timing can be evaluated as the behavior pattern having the out-of-range level at the next calculation timing. Accordingly, it is possible to exclude the behavior pattern having a relatively low similarity level from the target of the collision determination process.

According to the third aspect, the error data changing process is executed in addition to the similarity level evaluation process. According to the error data changing process, the error data to be used at the next processing timing of the distribution calculation process using the high similarity level is changed to error data smaller than the error data used at the current processing timing of the distribution calculation process. When the error data becomes smaller, the standard deviation of the probability density distribution calculated using the high similarity model at the next processing timing becomes smaller. Here, when the behavior pattern of the moving object does not change at each time, the similarity level for this behavior pattern is expected to be the high similarity level. However, an effect by the error data accumulates with the passage of time. Therefore, the standard deviation of the probability density distribution increases with the passage of time. Therefore, even when the behavior pattern does not change at each time, there is a possibility of determination that a collision between the vehicle and the moving object occurs in the future at a position sufficiently distant from the moving object. In this respect, when the standard deviation of the probability density distribution become small, it is possible to suppress occurrence of such an inconvenience.

According to the fourth aspect, the distribution recalculation process is executed in addition to the similarity level evaluation process. According to the distribution recalculation process, the probability density distribution calculated using the high similarity model at the current processing timing of the distribution calculation process is superposed on the probability density distribution calculated using the high similarity model at the processing timing prior to the current processing timing. When the superposition is executed, the standard deviation of the probability density distribution after the superposition becomes smaller than that before the superposition. Accordingly, according to the distribution recalculation process, the same effect as that obtained when the error data is changed to smaller data by the error data changing process is expected.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a diagram showing an example of the probability density distribution of the future position of the reference point of the moving object in a behavior pattern corresponding to a constant-speed straight-ahead model (that is, traveling straight ahead at a constant-speed);

FIG. 6 is a diagram showing an example of the probability density distribution of the future position of the reference point of the moving object in a behavior pattern corresponding to an acceleration model (that is, acceleration);

FIG. 7 is a diagram in which various trajectories shown in FIGS. 3 and 6 are arranged at the same time in the future;

FIG. 8 is a diagram showing an example of a similarity level;

DETAILED DESCRIPTION OF EMBODIMENTS

Figure 1:
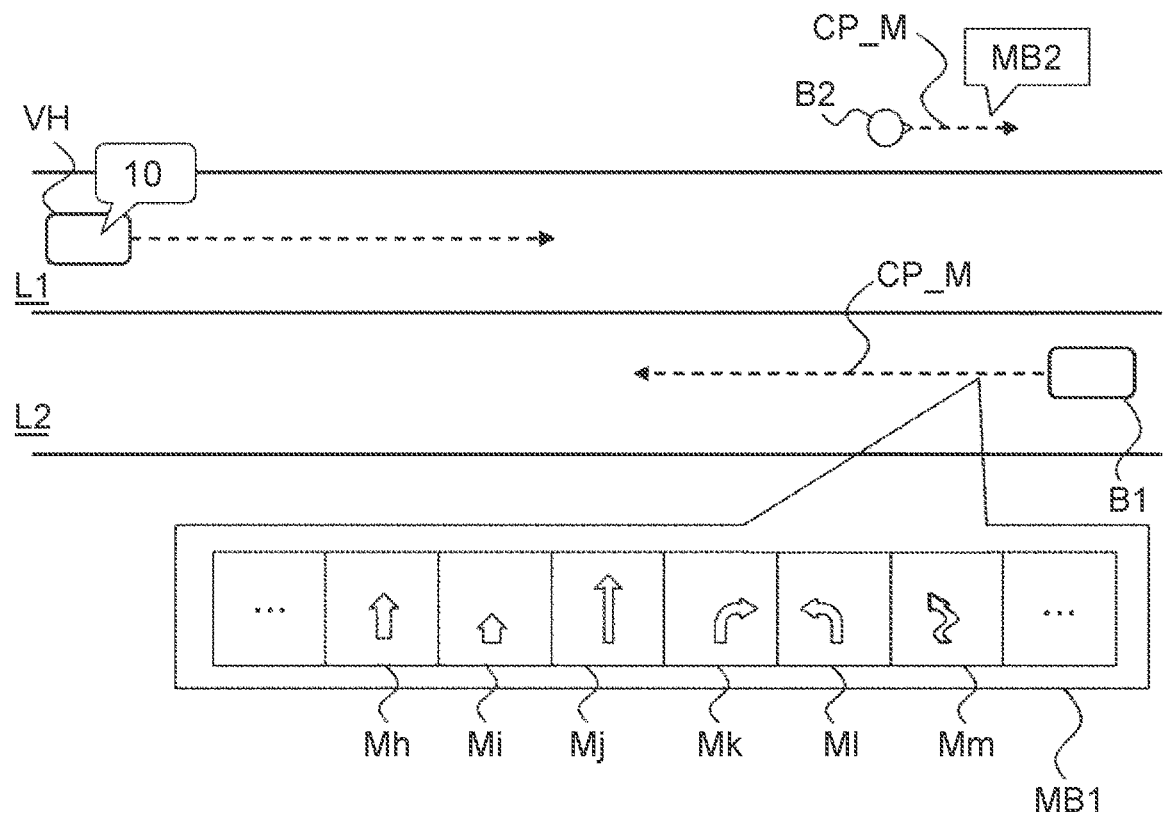
FIG. 1 is a diagram showing an example of a situation presupposed by an embodiment.

Hereinafter, embodiments of the disclosure will be described with reference to the drawings. In the drawings, the same or corresponding portions will be denoted by the same reference signs, and the description thereof will be simplified or omitted. Further, the present disclosure is not limited to the following embodiments, and can be implemented in various embodiments.

1. Abstract of Embodiments 1-1. Behavior Model

FIG. 1 is a diagram showing an example of a situation presupposed by an embodiment. FIG. 1 shows a vehicle VH moving in a lane L1. The vehicle VH is provided with a behavior prediction device 10 according to the embodiment. The vehicle VH is, for example, an automobile powered by an internal combustion engine such as a diesel engine or a gasoline engine, an electric vehicle powered by an electric motor, or a hybrid vehicle including the internal combustion engine and the electric motor. The electric motor is driven by a battery such as a secondary battery, a hydrogen fuel cell, a metal fuel cell, or an alcohol fuel cell.

FIG. 1 also shows a moving object B1 moving in a lane L2 and a moving object B2 moving in the roadside zone (or shoulder) of the lane L1. The moving objects B1 and B2 are examples of the surrounding moving objects B detected by the vehicle VH. Examples of the moving object B1 include a four-wheeled vehicle, a two-wheeled vehicle, and a bicycle. The four-wheeled vehicle includes large-sized vehicles such as buses and small-sized vehicles such as passenger cars. A moving direction of the moving object B1 is opposite to a traveling direction of the vehicle VH. Examples of the moving object B2 include pedestrians and animals. A moving direction of the moving object B2 is the same as the traveling direction of the vehicle VH.

In the example shown in FIG. 1, the state (position and speed) of the moving object B is detected by the vehicle VH. In the embodiment, a future behavior of the moving object B is predicted using the detection state above and a behavior model MB of the moving object B. The behavior model MB is preset in correspondence with various behavior patterns that the moving object B can take. Each of the behavior patterns can be regarded as a candidate for the future behavior of the moving object B. The behavior pattern is set for each type of the moving object B. The behavior pattern is set with reference to the moving direction of the moving object B.

Examples of a behavior model MB1 of the moving object B1 include a constant-speed straight-ahead model Mh, a deceleration model Mi, an acceleration model Mj, a right-turn model Mk, a left-turn model Ml, and a wobble model Mm. The behavior model MB1 also includes a model corresponding to a behavior pattern that specifies the traveling position of the moving object B1, such as the behavior of the moving object B1 moving at a position near the boundary between the lane L1 and the lane L2. The deceleration model Mi and the acceleration model Mj also include models assuming various accelerations such as a slow model and a rapid model. A behavior model MB2 of the moving object B2 is set for the same purpose as the purpose of setting the behavior model MB1.

A trajectory CP_M shown by the broken line in FIG. 1 schematically shows the future trajectory of the moving object B predicted using a certain behavior model MB. As already described above, the behavior model MB corresponds to various behavior patterns that the moving object B can take. Therefore, a plurality of the trajectories CP_M is actually present. Note that, the trajectories CP_M shown in FIG. 1 correspond to the future trajectories of the moving objects B1 and B2 predicted using the constant-speed straight-ahead model Mh, the deceleration model Mi, or the acceleration model Mj.

1-2. Probability Density Distribution

Figure 2:
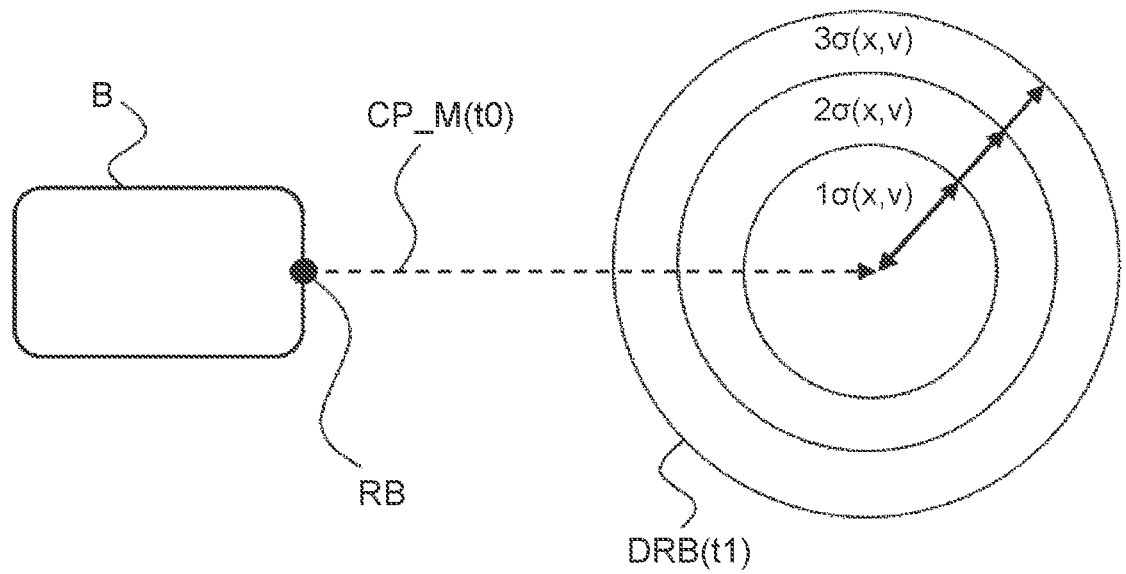
FIG. 2 is a diagram showing an example of a probability density distribution of a future position of a reference point of a moving object.

The detection state of the moving object B by the vehicle VH includes an error ε. The error ε includes at least one of a position error and a speed error. When the detection state includes the error ε, the future position of the moving object B is represented by a probability density distribution having the position on the trajectory CP_M as a mode value. FIG. 2 is a diagram showing an example of a probability density distribution DRB of the future position of a reference point RB of the moving object B. Note that, the reference point RB is set at an arbitrary position on the moving object B. A case where the time t=t0 is the current time will be considered. In this case, it can be said that the position of the reference point RB (that is, the future position) at the future time t=t1 is present in the intervals of 1σ to 3σ (σ: standard deviation) of the probability density distribution DRB (t1).

In the embodiment, the error ε is applied to prediction of the future behavior of the moving object B. In this prediction, the probability density distribution of the position of the reference point RB at the future time t1, t2, t3, . . . when the time t=t0 is set as the current time is calculated.

FIG. 3 is a diagram showing an example of a probability density distribution DRB1 of the future position of a reference point RB1 in the behavior pattern corresponding to the constant-speed straight-ahead model Mh (that is, traveling straight ahead at a constant-speed). In the upper diagram (i) in FIG. 3, the probability density distributions DRB1 (t1), DRB1 (t2), DRB1 (t3) at the future times t=t1, t2 and t3 when the time t=t0 is the current time are shown. In the lower diagram (ii) in FIG. 3, the probability density distributions DRB1 (t2), DRB1 (t3), and DRB1 (t4) at the future times t=t2, t3 and t4 when the time t=t1 is the current time are shown. As shown in FIG. 3, the intervals of 1σ to 3σ of the probability density distribution DRB gradually increase with the passage of time. The reason for the above is that the error ε accumulates with the passage of time.

Figure 4:
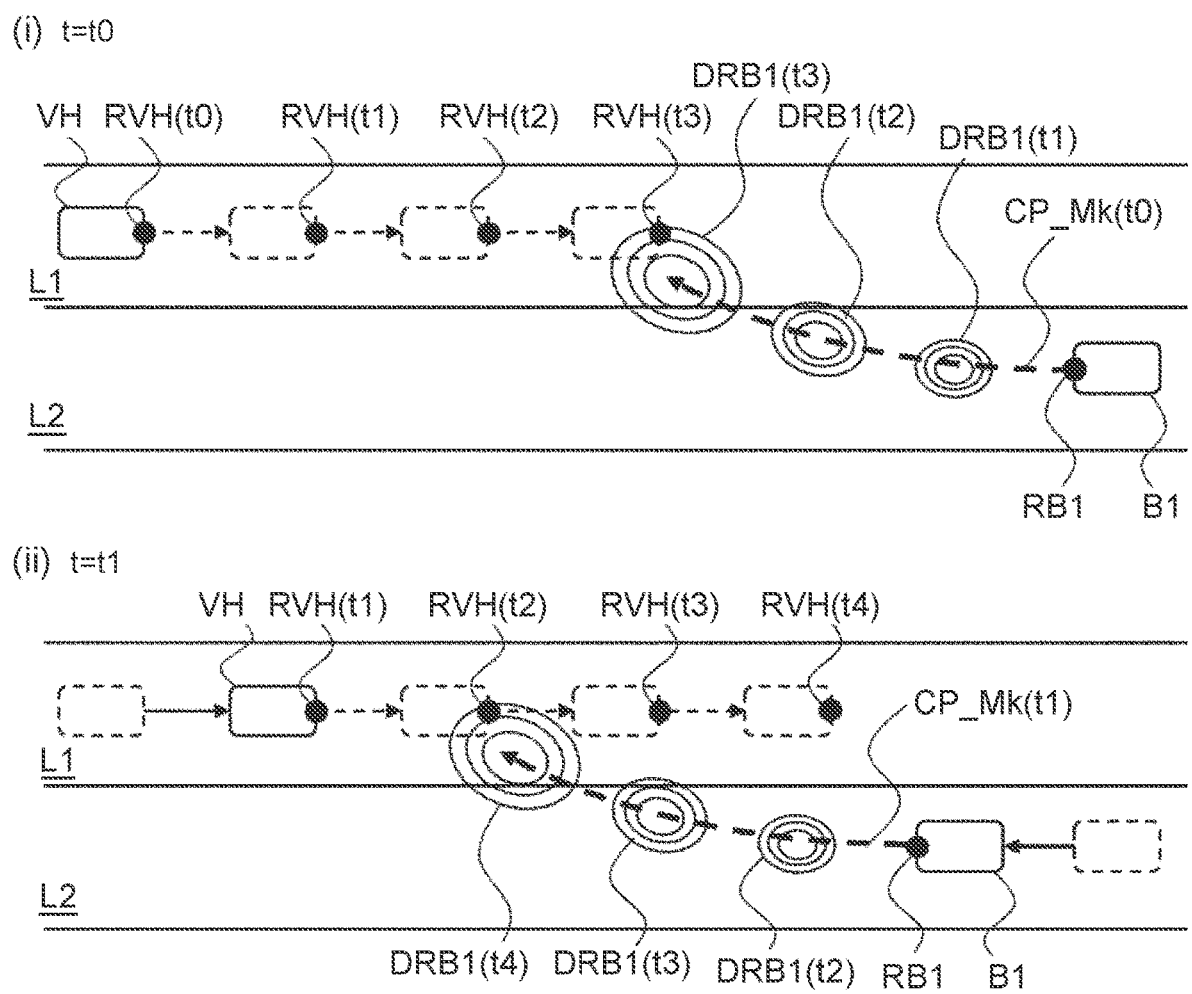
FIG. 4 is a diagram showing an example of the probability density distribution of the future position of the reference point of the moving object in a behavior pattern corresponding to a right-turn model (that is, turning right)

FIG. 4 is a diagram showing an example of the probability density distribution of the future position of the reference point RB1 in the behavior pattern corresponding to the right-turn model Mk (that is, turning right). The times t1 to t4 of the probability density distribution DRB1 shown in the upper diagram (i) and lower diagram (ii) in FIG. 4 indicate the same times as the times t1 to t4 shown in FIG. 3. The reason why the intervals of 1σ to 3σ of the probability density distribution DRB increase with the passage of time is as described above. For convenience of explanation, in FIGS. 3 and 4, the trajectory CP_M is represented as "CP_Mh (t0)", "CP_Mk (t1)" and the like using a combination of the behavior model MB used for the calculation of the probability density distribution DRB1 and the time at which the calculation is executed (that is, the current time).

1-3. Collision Detection

In the embodiment, whether a collision between the vehicle VH and the moving object B occurs in the future is determined (collision determination) using the probability density distribution DRB. In FIGS. 3 and 4, reference points RVH (t0) to RVH (t4) at respective times of the reference point RVH of the vehicle VH are shown.

In the collision determination, first, whether an intersection condition between the vehicle VH and the moving object B is satisfied is determined. In the determination of the intersection condition, first, the future time is aligned between the reference point RVH and the reference point RB1 with the current time as a reference. Then, at an arbitrary future time, whether the reference point RVH is present in the intervals of 1σ to 3σ of the probability density distribution DRB1 (hereinafter, also referred to as "determination interval") is determined. The determination interval may be limited to the intervals of 1σ and 2σ. Subsequently, when the reference point RVH is determined to be present in the determination interval, the intersection condition is determined to be satisfied. The upper diagram (i) in FIG. 4 corresponds to the case where the intersection condition is satisfied at the future time t3.

In the collision determination, whether the condition relating to the collision margin time TTC (time to collision) (hereinafter, also referred to as "TTC condition") is satisfied is determined. For example, when the interval from the time t0 to the time t3 is less than or equal to the time TTC, the TTC condition is satisfied. When the intersection condition and the TTC condition are satisfied, a collision between the vehicle VH and the moving object B is determined to occur in the future. Note that, in this case, the collision avoidance operation of the vehicle VH (specifically, at least one of deceleration and steering) is started. Alternatively, a process is executed to warn the driver that a collision with the moving object B is imminent.

As described above, the upper diagram (i) in FIG. 4 corresponds to the case where the intersection condition is satisfied. Therefore, when the TTC condition is satisfied in addition to the intersection condition, the collision avoidance operation is started or the warning process is executed. The issue here is the case where the actual behavior of the moving object B is not a right turn. The lower diagram (ii) in FIG. 4 shows that the moving object B travels straight ahead at a constant speed from the time t0 to the time t1.

That is, the lower diagram (ii) in FIG. 4 shows that the actual behavior of the moving object B from the time t0 to the time t1 is not a right turn.

However, in the case of the upper diagram (i) in FIG. 4, when the TTC condition is satisfied between the time t0 and the time t1, the collision avoidance operation is started or the warning process is executed. The collision avoidance operation or the warning process is actually unnecessary. If the collision avoidance operation that is unnecessary is performed, the traveling state of the vehicle VH is destabilized. If the warning process that is originally unnecessary is executed, the driver feels a sense of discomfort.

1-3-1. Similarity Level

Therefore, in the embodiment, a "similarity level RLv" is applied to the probability density distribution DRB calculated using the behavior model MB in order to narrow down the behavior pattern for performing the collision determination (determination of the intersection condition). The similarity level RLv uses the reference probability density distribution SDRB as a comparison reference. The reference probability density distribution SDRB is a past probability density distribution DRB calculated using the behavior model MB corresponding to the current behavior of the moving object B. In the comparison between the probability density distribution DRB and the reference probability density distribution SDRB, the Kullback-Leiber divergence (KLD) is calculated after the future times of the distributions DRB and SDRB are aligned. The KLD is an index for measuring the difference between two different probability density distributions, and is suitable as an element of the similarity level RLv.

Figure 5:
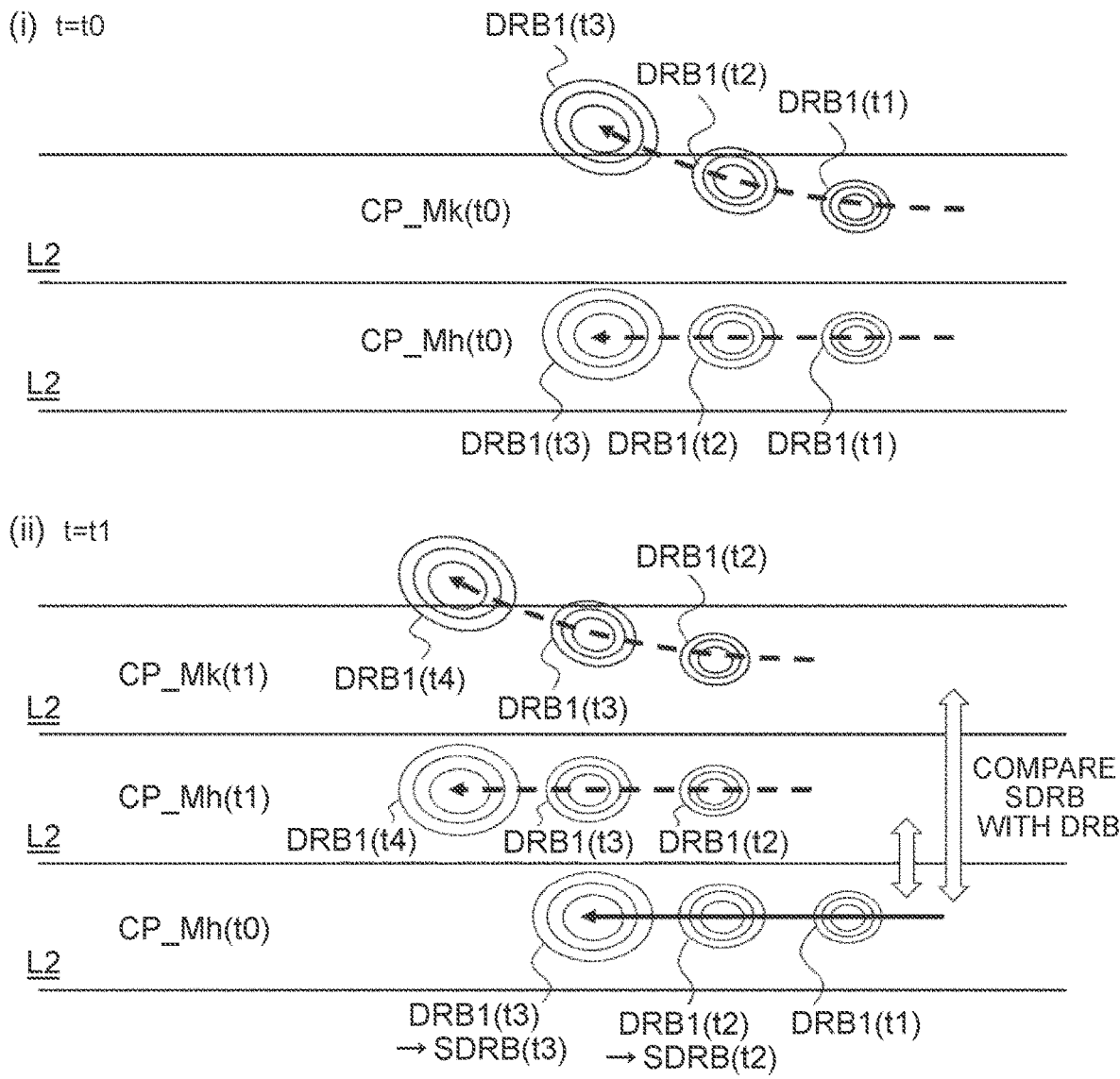
FIG. 5 is a diagram in which various trajectories shown in FIGS. 3 and 4 are arranged at the same time in the future.

FIG. 5 is a diagram in which the trajectories CP_Mk (t0), CP_Mh (t0), CP_Mk (t1), and CP_Mh (t1) shown in FIGS. 3 and 4 are arranged at the same time in the future. As described above, in the examples of FIGS. 3 and 4, the actual behavior pattern at times t0 and t1 is traveling straight ahead at a constant speed. That is, assuming that the time t=t1 is the current time, the behavior of the moving object B at least at the times t0 and t1 can be considered as the current behavior of the moving object B. Therefore, the current behavior in the example shown in FIG. 5 is "traveling straight ahead at a constant speed". Further, the reference probability density distribution SDRB becomes the probability density distributions DRB (t2) and DRB (t3) predicted at the time t0 using the constant-speed straight-ahead model Mh.

The reason why the probability density distribution DRB (t1) is not included in the reference probability density distribution SDRB is that the time t=t1 is set as the current time. When the conditions at the time t=t2 are aligned, the difference between the reference probability density distribution SDRB (t2) and the probability density distribution DRB (t2) calculated using the constant-speed straight-ahead model Mh at the time t1 is only the magnitude of 1σ to 3σ. This difference is the same even under the condition of the time t=t3. Therefore, the KLDs for the probability density distributions DRB (t2) and DRB (t3) both have high scores, and the similarity level RLv having the above as the elements is also high.

On the other hand, the KLD between the reference probability density distribution SDRB (t2) and the probability density distribution DRB (t2) calculated using the right-turn model Mk at the time t1 has a low score. The reason for this is that, in addition to the magnitude of 1σ to 3σ, the position of the lane L2 in the width direction is different. Further, the KLD between the reference probability density distribution SDRB (t3) and the probability density distribution DRB (t3) calculated using the right-turn model Mk at the time t1 has a further low score. Therefore, the similarity level RLv having the above as elements is also low.

Here, with reference to FIGS. 6 and 7, the similarity level RLv for the probability density distribution DRB calculated using the acceleration model Mj will be described. The times t1 to t4 of the probability density distribution DRB1 shown in the upper diagram (i) and lower diagram (ii) in FIG. 6 indicate the same times as the times t1 to t4 shown in FIGS. 3 and 4. The trajectories CP_Mh (t0) and CP_Mh (t1) shown in FIG. 7 are the same as those shown in FIG. 5. The reason why the intervals of 1σ to 3σ of the probability density distribution DRB increase with the passage of time is as described above.

As shown in FIG. 7, the KLD between the reference probability density distribution SDRB (t2) and the probability density distribution DRB (t2) calculated using the acceleration model Mj at the time t1 has a relatively high score. The reason for this is that the only differences between the distributions above are the magnitude of 1σ to 3σ and slight deviation of the position of the moving object B1 in the moving direction. Further, the KLD between the reference probability density distribution SDRB (t3) and the probability density distribution DRB (t3) calculated using the acceleration model Mj at the time t1 also has a relatively high score. Therefore, the similarity level RLv having the above as elements is also relatively high.

1-3-2. Evaluation of Similarity Level

In the embodiment, the similarity levels RLv are calculated for all the behavior patterns at the current time t. Then, when the similarity levels RLv for all the behavior patterns are calculated, the behavior pattern for performing the collision determination (determination of the intersection condition) is selected based on the similarity level RLv. FIG. 8 is a diagram showing an example of the similarity level RLv. As shown in FIG. 8, an allowable range AR is set for the similarity level RLv. The allowable range AR is set to exclude behavior patterns having a low similarity level RLv from the collision determination (determination of the intersection condition). That is, a behavior pattern in which the similarity level RLv falls below the allowable range AR is excluded from the collision determination (determination of intersection conditions).

Exclusion of the behavior pattern that falls below the allowable range AR as described above makes it possible to cancel execution of the determination of the intersection condition for this behavior pattern. Therefore, it is possible to avoid starting the collision avoidance operation that is originally unnecessary. Accordingly, when the behavior pattern is predicted using various behavior models MB, it is possible to suppress instability of the traveling state of the vehicle VH. In addition, it is possible to suppress execution of the warning processing that is originally unnecessary. Accordingly, it is possible to suppress execution of the warning process from causing the driver to feel a sense of discomfort. Further, it is possible to reduce the load of an intersection condition determination process and suppress a decrease in the responsiveness of the collision determination.

A high similarity threshold TH and a low similarity threshold TL are also set in the allowable range AR. The thresholds above are set to determine whether to change (increase or decrease) the error ε used in the next calculation timing of the probability density distribution DRB. The "next calculation timing" means, for example, a calculation timing corresponding to the future time t=t2 when the time t=t1 is set as the current time. In the embodiment, for the behavior pattern in which the similarity level RLv exceeds the high similarity threshold TH, the error ε used in the next calculation timing of the probability density distribution DRB using the corresponding behavior model MB is decreased. Conversely, for the behavior pattern in which the similarity level RLv falls below the low similarity threshold TL, the error ε is increased.

When the error ε is decreased, 1σ to 3σ of the probability density distribution DRB calculated at the next calculation timing become smaller. When the behavior pattern of the moving object B does not change at each time, the similarity level RLv for this behavior pattern is expected to exceed the high similarity threshold TH. However, the intervals of 1σ to 3σ of the probability density distribution DRB increase with the passage of time. Therefore, even in such a case, there is a possibility that the intersection condition is satisfied at a position sufficiently distant from the moving object B. In this respect, when 1σ to 3σ of the probability density distribution DRB become small, it is possible to suppress occurrence of such an inconvenience. This contributes to the improvement of the accuracy of collision determination.

When the error ε is increased, 1σ to 3σ of the probability density distribution DRB calculated at the next calculation timing become larger. When 1σ to 3σ of the probability density distribution DRB become larger, the similarity level RLv is expected to decrease. The behavior pattern in which the similarity level RLv falls below the low similarity threshold TL may be classified into a behavior pattern that falls below the allowable range AR. In this respect, when the similarity level RLv is decreased, the possibility of falling below the allowable range AR becomes higher. Therefore, it is possible to cancel the determination of the intersection condition for the behavior pattern in which the similarity level RLv falls below the low similarity threshold TL.

Hereinafter, the behavior prediction device according to the embodiment will be described.

2. Behavior Prediction Device

2-1. Configuration Example

Figure 9:
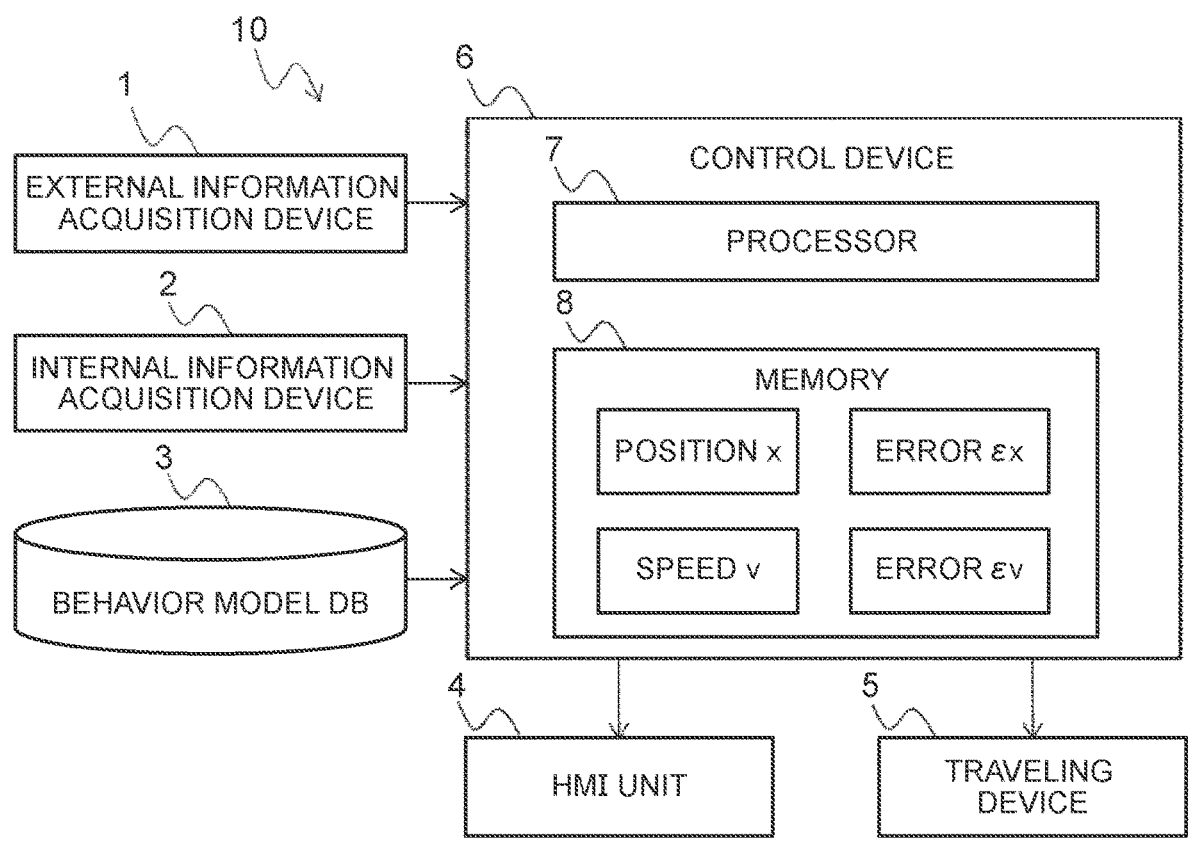
FIG. 9 is a block diagram showing an example of a behavior prediction device according to an embodiment.

FIG. 9 is a block diagram showing an example of the behavior prediction device 10 according to an embodiment. As shown in FIG. 9, the behavior prediction device 10 includes an external information acquisition device 1, an internal information acquisition device 2, a behavior model database (DB) 3, a human machine interface (HMI) unit 4, a traveling device 5, and a control device 6.

The external information acquisition device 1 detects a situation around the vehicle VH. Examples of the external information acquisition device 1 include a radar sensor and a camera. The radar sensor detects an object around the vehicle VH using radio waves (e.g. millimeter waves) or light. The object includes fixed objects and moving objects. Examples of the fixed objects include guardrails and buildings. Examples of the moving objects include a moving object B such as a four-wheeled vehicle, a two-wheeled vehicle, and a pedestrian. The camera captures an external situation around the vehicle VH. The camera is provided, for example, on a back side of a windshield. The external information acquisition device 1 transmits the detected external information to the control device 6.

The internal information acquisition device 2 detects a traveling condition of the vehicle VH. The internal information acquisition device 2 includes a vehicle speed sensor, an acceleration sensor, and a yaw rate sensor. The vehicle speed sensor detects a traveling speed of the vehicle VH. The acceleration sensor detects an acceleration of the vehicle VH. The yaw rate sensor detects a yaw rate about a vertical axis of the center of gravity of the vehicle VH. The internal information acquisition device 2 transmits the detected internal information to the control device 6.

The behavior model DB3 stores the behavior model MB. As already described above, the behavior model MB is preset in correspondence with various behavior patterns that the moving object B can take.

The HMI unit 4 is an interface for providing information to the driver (or a remote operator) of the vehicle VH and receiving information from the driver. The HMI unit 4 includes, for example, an input device, a display device, a speaker, and a microphone.

Examples of the input device include a touch panel, a keyboard, a switch, and a button. The information provided to the driver includes the traveling condition of the vehicle VH, alerts and warnings. The information is provided to the driver using the display device and the speaker. The information from the driver is received using the input device and the microphone.

The traveling device 5 includes various actuators. The various actuators include a drive actuator, a brake actuator, and a steering actuator. The drive actuator drives the vehicle VH. The braking actuator applies a braking force to the vehicle VH. The steering actuator steers the tires of the vehicle VH.

The control device 6 is a microcomputer including a least a processor 7 and a memory 8. The control device 6 receives various types of information (for example, external information and internal information) via an input and output interface. The information received by the control device 6 is stored in the memory 8. Examples of the memory 8 include a volatile memory and a non-volatile memory. The information stored in the memory 8 includes position data x, speed data v, position error data $\varepsilon x$, and speed error data $\varepsilon v$ of the moving object B. The processor 7 executes various processes based on the data and the program stored in the memory 8. The various processes include a process of predicting the future behavior of the moving object B (hereinafter, also referred to as a "future behavior prediction process"). Hereinafter, the functional configuration of the control device 6 related to the future behavior prediction process will be described.

2-2. Example of Functional Configuration of Control Device

Figure 10:
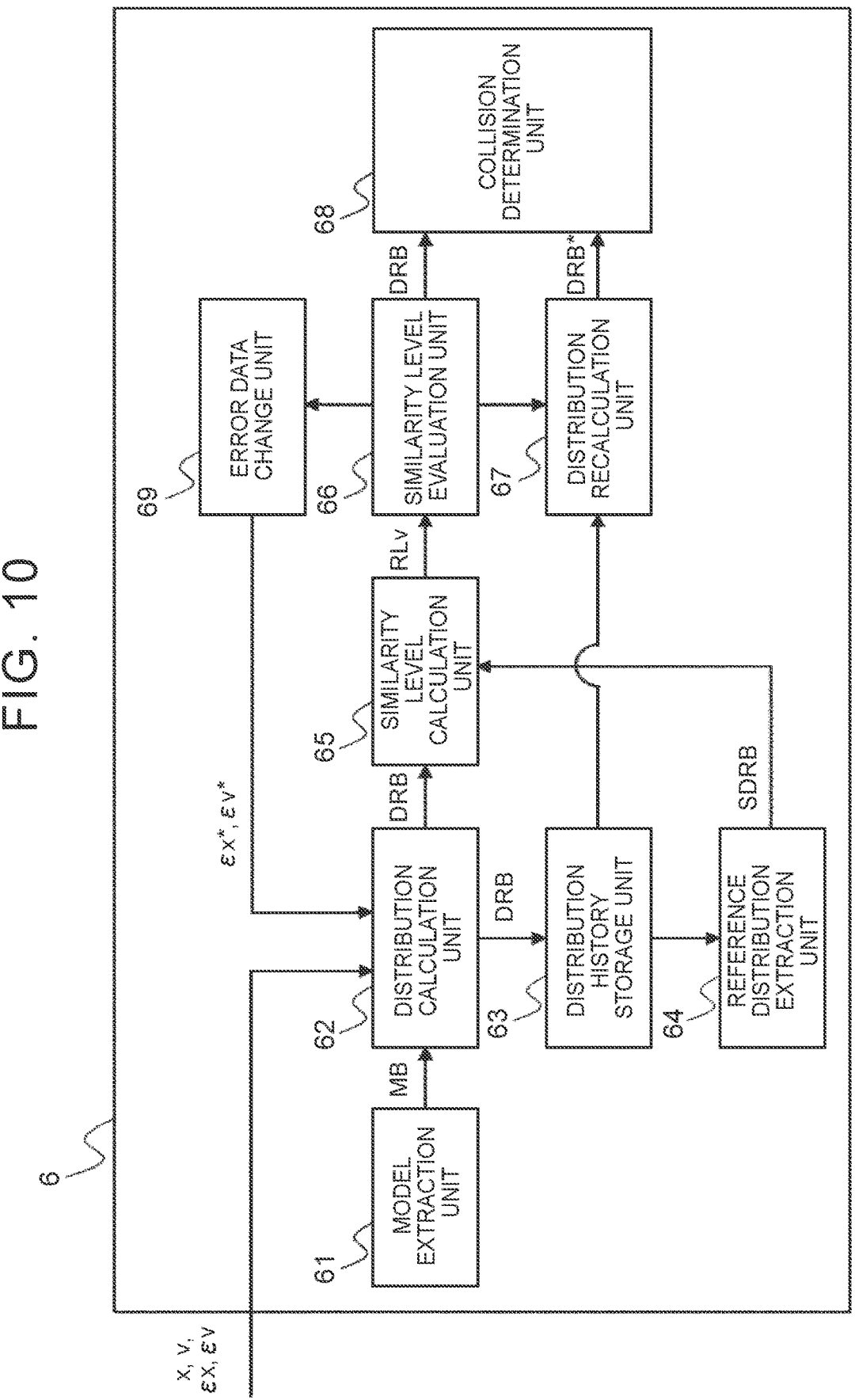
FIG. 10 is a block diagram showing a functional configuration example of a control device related to a future behavior prediction process.

FIG. 10 is a block diagram illustrating a functional configuration example of the control device 6 related to the future behavior prediction process. As shown in FIG. 10, the control device 6 includes a model extraction unit 61, a distribution calculation unit 62, a distribution history storage unit 63, a reference distribution extraction unit 64, a similarity level calculation unit 65, and a similarity level evaluation unit 66, a distribution recalculation unit 67, a collision determination unit 68, and an error data change unit 69. Note that, the functional blocks above are realized in a manner such that the processor 7 executes the program stored in the memory 8.

The model extraction unit 61 identifies the type of the moving object B based on the external information. The type of the moving object B is specified, for example, by analyzing an image captured by the camera. The type of the moving object B may be specified based on the position data x and the speed data v of the moving object B. The model extraction unit 61 extracts the behavior model MB corresponding to the specified type from the behavior model DB3. The extracted behavior model MB is all the models set in accordance with the type of the moving object B. The model extraction unit 61 transmits the extracted behavior model MB to the distribution calculation unit 62.

The model extraction unit 61 may specify an object ID of the moving object B. The object ID is specified by a tracking process based on the position data x and the speed data v of the moving object B. In the tracking process, when an object different from the object currently being detected is detected, a new object ID is assigned to the detected object. As a result of tracking, when the object recognized to be the same as the currently detected object is detected, the same object ID as the already assigned object ID is assigned to the detected object. When a new object ID is assigned to the moving object B, the model extraction unit 61 extracts the behavior model MB corresponding to the type of the moving object B. Then, while the moving object B continues to be detected, the behavior model MB first extracted is transmitted to the distribution calculation unit 62.

The model extraction unit 61 may cancel transmission of a part of the behavior model MB based on the external information before the extracted behavior model MB is transmitted to the distribution calculation unit 62. For example, when it is detected from the road marking of the lane L2 and the like that the U-turn in the lane L2 is prohibited, the model extraction unit 61 may cancel transmission of the behavior model MB corresponding to the U-turn. Further, for example, when a state where the red signal is lit with the traffic light located ahead of the traveling direction of the moving object B is recognized, the model extraction unit 61 may cancel transmission of the behavior model MB corresponding to the constant-speed straight-ahead movement and acceleration. As described above, transmission of a part of the behavior model MB may be canceled in light of the traffic rules, traffic conditions, and the like.

The distribution calculation unit 62 executes a distribution calculation process. In the distribution calculation process, the probability density distribution DRB is calculated using the behavior model MB received from the model extraction unit 61, the position data x and speed data v of the moving object B, and the error data $\varepsilon x$ and $\varepsilon v$ thereof.

The probability density distribution DRB is calculated by setting the time at which the position data x and the speed data v are acquired as the current time, and associating with a future time advanced from the set time in predetermined time intervals (for example, 1 second). The number of probability density distributions DRB calculated per process is not particularly limited. However, as the number of probability density distributions DRB increases, the computational load of the processor 7 increases. Therefore, it is desirable that the number of calculations per process be set in advance in accordance with the processing capacity of the processor 7.

As a general rule, preset values are used for the error data $\varepsilon x$ and $\varepsilon v$. However, when the correction data $\varepsilon x^*$ and $\varepsilon v^*$ related to the specific behavior model MB* are received from the error data change unit 69, correction data thereof are used exceptionally. Specifically, when the behavior model MB received from the model extraction unit 61 includes a specific behavior model MB*, the probability density distribution DRB is calculated using the behavior model MB*, the position data x and the speed data v of the moving object B, and the correction data εx* and εv*.

The distribution calculation unit 62 transmits the probability density distribution DRB obtained by the distribution calculation process to the similarity level calculation unit 65.

The distribution history storage unit 63 stores, in the memory 8, the probability density distribution DRB calculated by the distribution calculation unit 62. The probability density distribution DRB is stored in combination with the object ID, the behavior model MB, and the time (hh:mm:ss:fff) at which the calculation is executed. The dataset above constitutes the history of the probability density distribution DRB.

The reference distribution extraction unit 64 extracts the reference probability density distribution SDRB. The distribution history storage unit 63 stores the probability density distribution DRB calculated at a past time that goes back in a predetermined time interval from the current time. The reference distribution extraction unit 64 estimates the current behavior of the moving object B based on external information from the previous calculation timing of the probability density distribution DRB to the current calculation timing. The "current calculation timing" means a calculation timing corresponding to the current time. The "previous calculation timing" means, for example, a calculation timing corresponding to the past time t=t0 when the time t=t1 is set as the current time.

The reference distribution extraction unit 64 extracts the reference probability density distribution SDRB from the history stored in the distribution history storage unit 63 using the estimated current behavior of the moving object B as a search key. The search key includes the object ID of the moving object B and the time t corresponding to the previous calculation timing of the probability density distribution DRB. The reference distribution extraction unit 64 transmits the extracted reference probability density distribution SDRB to the similarity level calculation unit 65.

The similarity level calculation unit 65 executes a similarity level calculation process. In the similarity level calculation process, the similarity level RLv between the probability density distribution DRB received from the distribution calculation unit 62 and the reference probability density distribution SDRB received from the reference distribution extraction unit 64 is calculated. For calculation of the similarity level RLv, the KLD is calculated after the future times of the distributions DRB and SDRB are aligned. The KLD is calculated every time tin the future.

For example, assuming that the time t=t0 is the current time, the similarity level RLv is calculated by the following equation (1) using the KLD of the future time t=t1, t2, . . . , Tn.

$$RLv = w1 \cdot KLD(t1) + w2 \cdot KLD + (t2) + \ldots + wn \cdot KLD(tn) \quad (1)$$

In the equation (1), w1, w2 and wn are weighting coefficients satisfying the following equation (2).

$$w1 + w2 + \ldots + wn = 1 \quad (2)$$

The similarity level calculation unit 65 transmits the calculated similarity level RLv to the similarity level evaluation unit 66.

Figure 11:
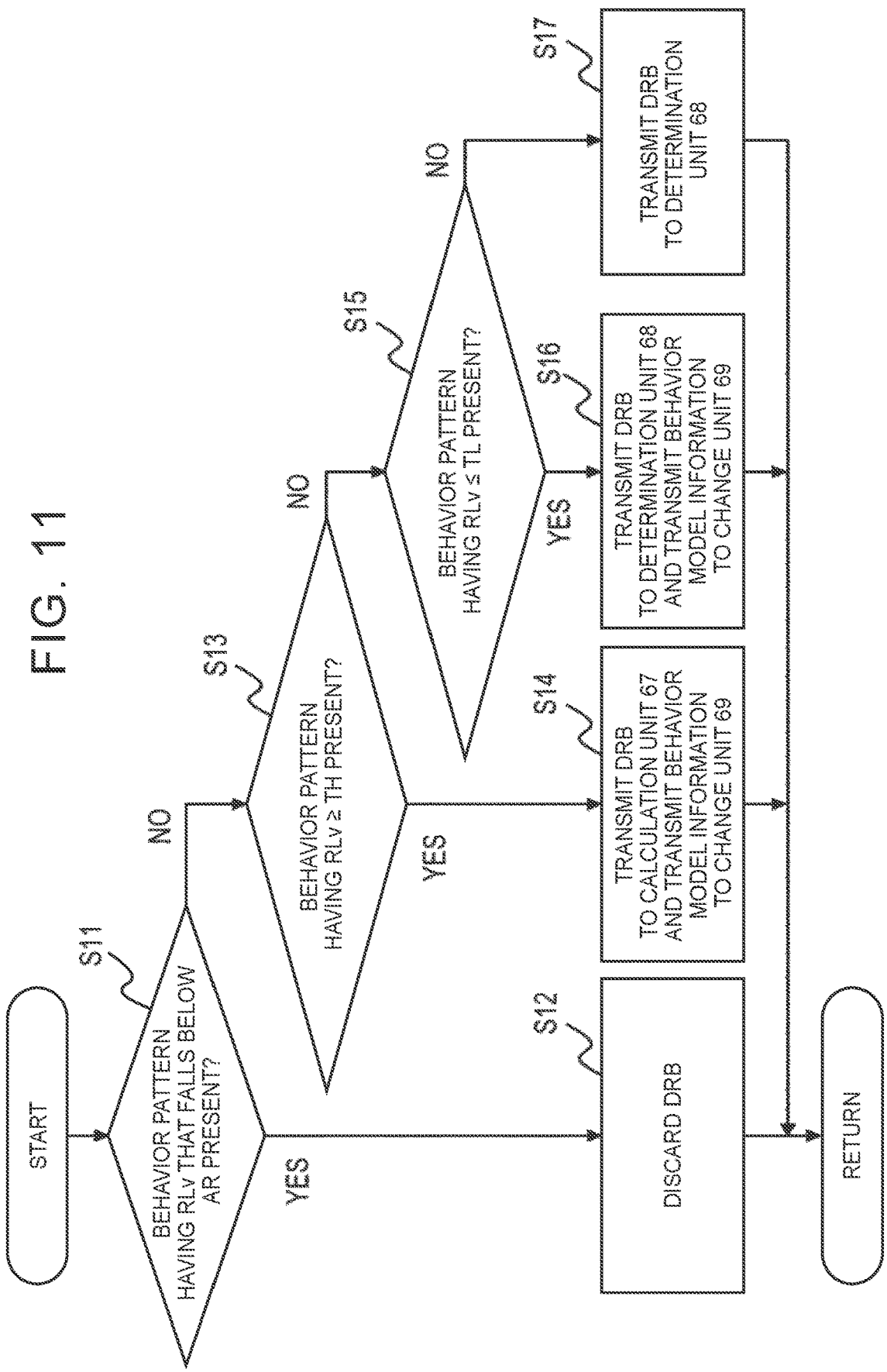
FIG. 11 is a flowchart showing a flow of a similarity level evaluation process.

The similarity level evaluation unit 66 executes a similarity level evaluation process. First, the similarity level evaluation process will be described with reference to FIG. 11. FIG. 11 is a flowchart showing the flow of the similarity level evaluation process executed by the processor 7. The routine shown in FIG. 11 is repeatedly executed each time the similarity level RLv is calculated for all the behavior patterns at the current time. Needless to say, when the transmission of a part of the behavior model MB is canceled in light of traffic rules, etc., the behavior pattern corresponding to the canceled behavior model MB is not included in "all the behavior patterns at the current time".

In the routine shown in FIG. 11, it is determined whether a behavior pattern having the similarity level RLv that falls below the allowable range AR (hereinafter, also referred to as "out-of-range level RNA") is included (step S11). An example of the allowable range AR is as described in FIG. 8. When it is determined that a behavior pattern having the out-of-range level RNA is included, the probability density distribution DRB calculated using the behavior model MB corresponding to the behavior pattern is discarded (step S12).

When the determination result in step S11 is negative, it is determined whether a behavior pattern having the similarity level RLv satisfying RLv≥TH (hereinafter, also referred to as "high similarity level RLH") is included (step S13). The high similarity threshold TH is as described in FIG. 8. When it is determined that a behavior pattern having the high similarity level RLH is included, the probability density distribution DRB calculated using the behavior model MB corresponding to the behavior pattern (hereinafter, also referred to as "high similarity model MBH") is transmitted to the distribution recalculation unit 67 (step S14). In the process in step S14, the information on the high similarity model MBH is further transmitted to the error data change unit 69.

When the determination result in step S13 is negative, it is determined whether a behavior pattern having the similarity level RLv satisfying RLv≤TL (hereinafter, also referred to as "low similarity level RLL") is included (step S15). The low similarity threshold TL is as described in FIG. 8. When it is determined that a behavior pattern having the low similarity level RLL is included, the probability density distribution DRB calculated using the behavior model MB corresponding to the behavior pattern (hereinafter, also referred to as "low similarity model MBL) is transmitted to the collision determination unit 68 (step S16). In the process in step S16, the information of the low similarity model MBL is further transmitted to the error data change unit 69.

When the determination result in step S15 is negative, it is assumed that a behavior pattern having the similarity level RLv satisfying TL<RLv<TH (hereinafter, also referred to as "medium similarity level RLM") remains. Therefore, in this case, the probability density distribution DRB calculated using the behavior model MB corresponding to the remaining behavior pattern is transmitted to the collision determination unit 68 (step S17). Note that, it is also assumed that there is no remaining behavior pattern having the medium similarity level RLM. Therefore, before the process in step S17, it may be determined whether a behavior pattern having the medium similarity level RLM is included. Then, when the determination result is affirmative, the process in step S17 may be executed.

Figure 12:
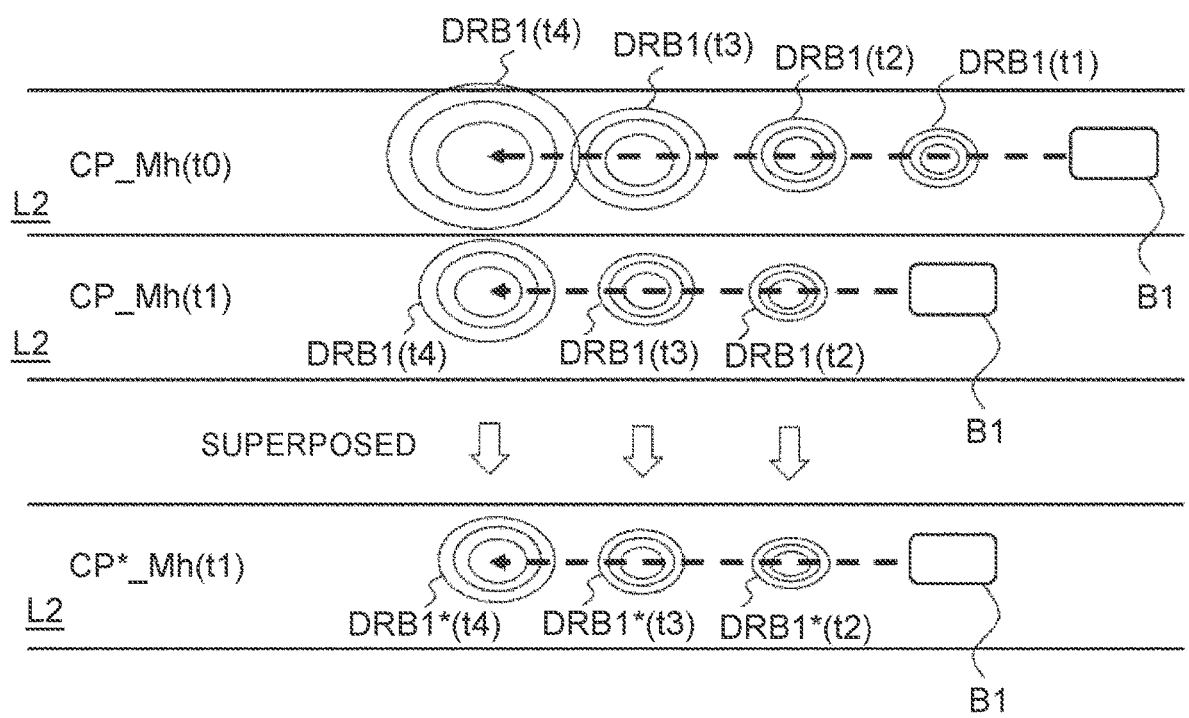
FIG. 12 is a diagram showing an example of a distribution recalculation process.

Returning to FIG. 10, the description of the configuration example of the control device 6 will be continued. The distribution recalculation unit 67 executes a distribution recalculation process. This distribution recalculation process will be described with reference to FIG. 12. FIG. 12 is a diagram showing an example of the distribution recalculation process. The target of the distribution recalculation process is the probability density distribution DRB calculated using the high similarity model MBH. Therefore, in FIG. 12, a case where the constant-speed straight-ahead model Mh corresponds to the high similarity model MBH will be described as an example.

In the example shown in FIG. 12, the trajectories CP_Mh (t0) and CP_Mh (t1) shown in FIG. 3 are arranged in the same time in the future. Unlike FIG. 3, the probability density distribution DRB (t4) predicted at time t4 is added to FIG. 12. In the distribution recalculation process, the probability density distributions DRB1 at the future times t2, t3 and t4 when the time t=t1 is set as the current time are superimposed. The objects of superposition are the probability density distribution DRB1 calculated using the high similarity model MBH at the time t=t1 and the probability density distribution DRB1 at the time prior to the current time (the time t=t0 in the example shown in FIG. 12). The probability density distributions DRB1 are superposed at each future time. Note that, the probability density distribution DRB1 (t1) at the current time t=t1 is not subject to superposition.

The difference between the probability density distributions DRB1 (t2) to DRB1 (t4) shown in the upper diagram in FIG. 12 and those shown in the lower diagram is only the magnitudes of 1σ to 3σ. Therefore, when the probability density distributions DRB1 in the upper diagram and the lower diagram are superposed at each future time, 1σ to 3σ of the probability density distributions DRB1* after the superposition become smaller as compared with 1σ to 3σ of the probability density distributions DRB1 before the superposition. When the superposition is executed as described above, the degree of variation in the future position of the moving object B becomes small.

The distribution calculation unit 62 transmits the probability density distribution DRB* after the superposition that is obtained in the distribution recalculation process to the collision determination unit 68.

The collision determination unit 68 executes a collision determination process. In the collision determination process, whether the intersection condition and the TTC condition are satisfied is determined using the probability density distribution DRB received from the similarity level evaluation unit 66 or the distribution recalculation unit 67. In the intersection condition determination process, the future time is aligned between the reference point RVH and the reference point RB with the current time as a reference. Then, at an arbitrary future time, whether the reference point RVH is present in the determination interval is determined. Subsequently, when the reference point RVH is determined to be present in the determination interval, the intersection condition is determined to be satisfied.

In the TTC condition determination process, whether the interval from the current time to the future time when the intersection condition is determined to be satisfied is less than or equal to the time TTC is determined. When the interval is determined to be less than or equal to the time TTC, the TTC condition is determined to be satisfied.

In the collision determination process, when the intersection condition and the TTC condition are determined to be satisfied, it is determined that a collision between the vehicle VH and the moving object B occurs in the future. When it is determined that a collision occurs, the collision determination unit 68 outputs a control command for starting the collision avoidance operation of the vehicle VH to the traveling device 5. When the control command is output, the traveling device 5 controls at least one of the braking actuator and the steering actuator. The collision determination unit 68 also outputs a warning signal to the HMI unit 4 indicating that a collision with the moving object B is imminent.

The error data change unit 69 executes an error data changing process. In the error data changing process, information on the high similarity model MBH and information on the low similarity model MBL received from the similarity level evaluation unit 66 are referred to. When the information on the high similarity model MBH is received, the error ε used in the next calculation timing of the probability density distribution DRB using the high similarity model MBH is changed. The error ε* after the change shows a smaller value than the error ε before the change. That is, the error ε is decreased. The error ε is also changed when the information on the low similarity model MBL is received. The error ε* after the change shows a larger value than the error ε before the change. That is, the error ε is increased.

3. Effect

According to the behavior prediction device of the embodiment described above, the distribution calculation process, the reference distribution calculation process, the similarity level calculation process, and the similarity level evaluation process are executed. In particular, according to the similarity level evaluation process, it is possible to exclude the behavior pattern having the out-of-range level RNA from the target of the collision determination process. Therefore, it is possible to avoid starting the collision avoidance operation that is originally unnecessary. Accordingly, when the behavior pattern is predicted using various behavior models MB, it is possible to suppress instability of the traveling state of the vehicle VH. In addition, it is possible to suppress execution of the warning processing that is originally unnecessary. Accordingly, it is possible to suppress execution of the warning process from causing the driver to feel a sense of discomfort. Further, it is possible to reduce the load of the intersection condition determination process and suppress a decrease in the responsiveness of the collision determination.

Further, according to the behavior prediction device of the embodiment, the error data changing process is executed in addition to the similarity level evaluation process. According to the error data changing process, the error ε for the behavior pattern having the low similarity level RLL is increased. When the error ε is increased, 1σ to 3σ of the probability density distribution DRB to be calculated using the low similarity model MBL at the next calculation timing increase. Therefore, the similarity level RLv can fall below the allowable range AR by lowering the similarity level RLv calculated from the probability density distribution DRB above. Then, the behavior pattern evaluated to have the low similarity level RLL at the current calculation timing is evaluated as the behavior pattern having the out-of-range level RNA at the next calculation timing. Therefore, it is possible to exclude the behavior pattern having a relatively low similarity level RLv from the target of the collision determination process.

According to the error data changing process, the error ε for the behavior pattern having the high similarity level RLH is decreased. When the error ε is decreased, 1σ to 3σ of the probability density distribution DRB to be calculated using the high similarity model MBH at the next calculation timing decrease. When the behavior pattern of the moving object B does not change at each time, the similarity level RLv for this behavior pattern is expected to be the high similarity level RLH. However, the intervals of 1σ to 3σ of the probability density distribution DRB increase with the passage of time. Therefore, even in such a case, there is a possibility that the intersection condition is satisfied at a position sufficiently distant from the moving object B. In this respect, when 1σ to 3σ of the probability density distribution DRB become small, it is possible to suppress occurrence of such an inconvenience. This contributes to the improvement of the accuracy of collision determination.

Further, according to the behavior prediction device of the embodiment, the distribution recalculation process is executed in addition to the similarity level evaluation process. According to the distribution recalculation process, the probability density distribution DRB calculated using the high similarity model MBH at the current time and the probability density distribution DRB calculated using the high similarity model MBH at a time prior to the current time are superposed. When the superposition is executed, 1σ to 3σ of the probability density distribution DRB1* after the superposition become smaller than 1σ to 3σ of the probability density distribution DRB1 before the superposition. Accordingly, according to the distribution recalculation process, the same effect as that obtained when the error ε is decreased by the error data changing process is expected.

What is claimed is:

1. A behavior prediction device that predicts a future behavior of a moving object around a vehicle, the moving object being detected by the vehicle, the behavior prediction device comprising:
    a database that stores a plurality of behavior models set for each behavior pattern corresponding to a type of the moving object;
    a memory that stores position data and speed data of the moving object and error data indicating an error of the position data and the speed data; and
    a processor, wherein:
    the processor is configured to execute:
        a distribution calculation process of calculating a probability density distribution related to a future position of the moving object for each of the behavior patterns using the position data, the speed data, the error data, and the behavior models,
        a similarity level calculation process of calculating a similarity level between the probability density distribution and a reference probability density distribution for each of the behavior patterns, the reference probability density distribution indicating the probability density distribution calculated using the behavior model corresponding to a current behavior of the moving object at a processing timing prior to a current processing timing of the distribution calculation process,
        a similarity level evaluation process of evaluating the similarity level,
        an error data changing process of changing the error data based on the similarity level,
        a collision determination process of determining a collision between the vehicle and the moving object using the probability density distribution, and
        upon determination of the collision between the vehicle and the moving object, actuating at least one of a braking actuator and a steering actuator to cause the vehicle to perform a collision avoidance operation;
    the similarity level includes an out-of-range level that falls below a similarity allowable range;
    the similarity level includes a low similarity level that is present within the similarity allowable range and falls below a low similarity threshold set within the similarity allowable range;
    in the similarity level evaluation process, the processor excludes the behavior pattern having the out-of-range level from a target of the collision determination process;
    in the error data changing process, the processor increases the error data to be used at a next processing timing of the distribution calculation process using a low similarity model as compared with the error data used at the current processing timing of the distribution calculation process; and
    the low similarity model indicates the behavior model corresponding to the behavior pattern having the low similarity level.

2. The behavior prediction device according to claim 1, wherein:
    the similarity level includes a high similarity level that is present within the similarity allowable range and exceeds a high similarity threshold set within the similarity allowable range;
    the processor is further configured to execute a distribution recalculation process of recalculating the probability density distribution using a high similarity model indicating the behavior model corresponding to the behavior pattern having the high similarity level;
    in the distribution recalculation process, the processor executes a superposition of the probability density distribution calculated using the high similarity level at the current processing timing on the probability density distribution calculated using the high similarity level at a processing timing prior to the current processing timing; and
    in the collision determination process, the processor determines the behavior pattern having the high similarity level based on the probability density distribution after the superposition by the distribution recalculation process.

3. A behavior prediction device that predicts a future behavior of a moving object around a vehicle, the moving object being detected by the vehicle, the behavior prediction device comprising:
    a database that stores a plurality of behavior models set for each behavior pattern corresponding to a type of the moving object;
    a memory that stores position data and speed data of the moving object and error data indicating an error of the position data and the speed data; and
    a processor, wherein:
    the processor is configured to execute
        a distribution calculation process of calculating a probability density distribution related to a future position of the moving object for each of the behavior patterns using the position data, the speed data, the error data, and the behavior models,
        a similarity level calculation process of calculating a similarity level between the probability density distribution and a reference probability density distribution for each of the behavior patterns, the reference probability density distribution indicating the probability density distribution calculated using the behavior model corresponding to a current behavior of the moving object at a processing timing prior to a current processing timing of the distribution calculation process,
a similarity level evaluation process of evaluating the similarity level,
an error data changing process of changing the error data based on the similarity level,
a collision determination process of determining a collision between the vehicle and the moving object using the probability density distribution, and
upon determination of the collision between the vehicle and the moving object, actuating at least one of a braking actuator and a steering actuator to cause the vehicle to perform a collision avoidance operation;
the similarity level includes an out-of-range level that falls below a similarity allowable range;
the similarity level includes a high similarity level that is present within the similarity allowable range and exceeds a high similarity threshold set within the similarity allowable range;
in the similarity level evaluation process, the processor excludes the behavior pattern having the out-of-range level from a target of the collision determination process;
in the error data changing process, the processor decreases the error data to be used at a next processing timing of the distribution calculation process using a high similarity model as compared with the error data used at the current processing timing of the distribution calculation process; and
the high similarity model indicates the behavior model corresponding to the behavior pattern having the high similarity level.

4. A behavior prediction device that predicts a future behavior of a moving object around a vehicle, the moving object being detected by the vehicle, the behavior prediction device comprising:
a database that stores a plurality of behavior models set for each behavior pattern corresponding to a type of the moving object;
a memory that stores position data and speed data of the moving object and error data indicating an error of the position data and the speed data; and
a processor, wherein:
the processor is configured to execute
a distribution calculation process of calculating a probability density distribution related to a future position of the moving object for each of the behavior patterns using the position data, the speed data, the error data, and the behavior models,
a similarity level calculation process of calculating a similarity level between the probability density distribution and a reference probability density distribution for each of the behavior patterns, the reference probability density distribution indicating the probability density distribution calculated using the behavior model corresponding to a current behavior of the moving object at a processing timing prior to a current processing timing of the distribution calculation process,
a similarity level evaluation process of evaluating the similarity level,
a collision determination process of determining a collision between the vehicle and the moving object using the probability density distribution, and
upon determination of the collision between the vehicle and the moving object, actuating at least one of a braking actuator and a steering actuator to cause the vehicle to perform a collision avoidance operation;
the similarity level includes an out-of-range level that falls below a similarity allowable range;
the similarity level includes a high similarity level that is present within the similarity allowable range and exceeds a high similarity threshold set within the similarity allowable range;
in the similarity level evaluation process, the processor excludes the behavior pattern having the out-of-range level from a target of the collision determination process;
the processor is further configured to execute a distribution recalculation process of recalculating the probability density distribution using a high similarity model indicating the behavior model corresponding to the behavior pattern having the high similarity level;
in the distribution recalculation process, the processor executes a superposition of the probability density distribution calculated using the high similarity level at the current processing timing on the probability density distribution calculated using the high similarity level at a processing timing prior to the current processing timing; and
in the collision determination process, the processor determines the behavior pattern having the high similarity level based on the probability density distribution after the superposition by the distribution recalculation process.

* * * * *